United States Patent
Sherlock et al.

(10) Patent No.: US 10,402,287 B2
(45) Date of Patent: Sep. 3, 2019

(54) PREVENTING DATA CORRUPTION AND SINGLE POINT OF FAILURE IN A FAULT-TOLERANT MEMORY

(71) Applicant: HEWLETT PACKARD ENTERPRISE DEVELOPMENT LP, Houston, TX (US)

(72) Inventors: Derek Alan Sherlock, Fort Collins, CO (US); Harvey Ray, Fort Collins, CO (US); Chris Michael Brueggen, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/500,064

(22) PCT Filed: Jan. 30, 2015

(86) PCT No.: PCT/US2015/013817
§ 371 (c)(1),
(2) Date: Jan. 30, 2017

(87) PCT Pub. No.: WO2016/122610
PCT Pub. Date: Aug. 4, 2016

(65) Prior Publication Data
US 2017/0249223 A1    Aug. 31, 2017

(51) Int. Cl.
*G06F 11/00* (2006.01)
*G06F 11/20* (2006.01)
*G06F 11/10* (2006.01)

(52) U.S. Cl.
CPC ........ *G06F 11/2092* (2013.01); *G06F 11/108* (2013.01); *G06F 11/2094* (2013.01); *G06F 2201/805* (2013.01)

(58) Field of Classification Search
CPC ............. G06F 11/2092; G06F 11/2094; G06F 11/073; G06F 11/1032; G06F 11/1076; G06F 11/2089; G06F 11/2005; G06F 11/2097; G06F 2201/805
See application file for complete search history.

(56) References Cited

U.S. PATENT DOCUMENTS

| | | |
|---|---|---|
| 5,032,744 A | 7/1991 | Wai Yeung Liu |
| 5,243,592 A | 9/1993 | Perlman et al. |
| 5,327,553 A | 7/1994 | Jewett et al. |
| 5,533,999 A | 7/1996 | Hood et al. |

(Continued)

FOREIGN PATENT DOCUMENTS

| | | |
|---|---|---|
| CN | 101576805 A | 11/2009 |
| CN | 102521058 A | 6/2012 |

(Continued)

OTHER PUBLICATIONS

International Search Report and Written Opinion; PCT/US2015/013817; dated Oct. 29, 2015; 13 pages.

(Continued)

*Primary Examiner* — Joseph D Manoskey
(74) *Attorney, Agent, or Firm* — Rathe Lindenbaum LLP

(57) ABSTRACT

According to an example, data corruption and single point of failure is prevented in a fault-tolerant memory fabric with multiple redundancy controllers by granting, by a parity media controller, a lock of a stripe to a redundancy controller to perform a sequence on the stripe. The lock may be broken in response to determining a failure of the redundancy controller prior to completing the sequence. In response to breaking the lock, the parity cacheline of the stripe may be flagged as invalid. Also, a journal may be updated to document the breaking of the lock.

15 Claims, 11 Drawing Sheets

(56) References Cited

U.S. PATENT DOCUMENTS

| | | | |
|---|---|---|---|
| 5,546,535 A | 8/1996 | Stallmo et al. | |
| 5,555,266 A | 9/1996 | Buchholz et al. | |
| 5,633,996 A | 5/1997 | Hayashi et al. | |
| 5,633,999 A | 5/1997 | Clowes et al. | |
| 5,724,046 A | 3/1998 | Martin et al. | |
| 5,905,871 A | 5/1999 | Buskens et al. | |
| 6,073,218 A | 6/2000 | DeKoning et al. | |
| 6,081,907 A | 6/2000 | Witty et al. | |
| 6,092,191 A | 7/2000 | Shimbo et al. | |
| 6,141,324 A | 10/2000 | Abbott et al. | |
| 6,151,659 A | 11/2000 | Solomon et al. | |
| 6,181,704 B1 | 1/2001 | Drottar et al. | |
| 6,389,373 B1 | 5/2002 | Ohya | |
| 6,457,098 B1 | 9/2002 | DeKoning et al. | |
| 6,467,024 B1 | 10/2002 | Bish et al. | |
| 6,490,659 B1 * | 12/2002 | McKean | G06F 11/1441 |
| | | | 711/141 |
| 6,502,165 B1 | 12/2002 | Kishi et al. | |
| 6,510,500 B2 | 1/2003 | Sarkar | |
| 6,542,960 B1 | 4/2003 | Wong et al. | |
| 6,654,830 B1 | 11/2003 | Taylor et al. | |
| 6,735,645 B1 | 5/2004 | Weber et al. | |
| 6,826,247 B1 | 11/2004 | Elliott et al. | |
| 6,834,326 B1 | 12/2004 | Wang et al. | |
| 6,911,864 B2 | 6/2005 | Bakker et al. | |
| 6,938,091 B2 | 8/2005 | Das Sharma | |
| 6,970,987 B1 | 11/2005 | Ji et al. | |
| 7,366,808 B2 | 4/2008 | Kano et al. | |
| 7,506,368 B1 | 3/2009 | Kersey et al. | |
| 7,738,540 B2 | 6/2010 | Yamasaki et al. | |
| 7,839,858 B2 | 11/2010 | Wiemann et al. | |
| 7,908,513 B2 * | 3/2011 | Ogasawara | G06F 8/61 |
| | | | 714/43 |
| 7,934,055 B2 | 4/2011 | Flynn et al. | |
| 7,996,608 B1 | 8/2011 | Chatterjee et al. | |
| 8,005,051 B2 | 8/2011 | Watanabe | |
| 8,018,890 B2 | 9/2011 | Venkatachalam et al. | |
| 8,054,789 B2 | 11/2011 | Boariu et al. | |
| 8,103,869 B2 | 1/2012 | Balandin et al. | |
| 8,135,906 B2 | 3/2012 | Wright et al. | |
| 8,161,236 B1 | 4/2012 | Noveck et al. | |
| 8,169,908 B1 | 5/2012 | Sluiter et al. | |
| 8,171,227 B1 | 5/2012 | Goldschmidt et al. | |
| 8,332,704 B2 | 12/2012 | Chang et al. | |
| 8,341,459 B2 | 12/2012 | Kaushik et al. | |
| 8,386,834 B1 | 2/2013 | Goel et al. | |
| 8,386,838 B1 | 2/2013 | Byan | |
| 8,462,690 B2 | 6/2013 | Chang et al. | |
| 8,483,116 B2 | 7/2013 | Chang et al. | |
| 8,605,643 B2 | 12/2013 | Chang et al. | |
| 8,619,606 B2 | 12/2013 | Nagaraja | |
| 8,621,147 B2 | 12/2013 | Galloway et al. | |
| 8,667,322 B1 | 3/2014 | Chatterjee et al. | |
| 8,700,570 B1 | 4/2014 | Marathe et al. | |
| 8,793,449 B1 | 7/2014 | Kimmel | |
| 8,812,901 B2 | 8/2014 | Sheffield, Jr. | |
| 9,128,948 B1 | 9/2015 | Raorane | |
| 9,166,541 B2 | 10/2015 | Funato et al. | |
| 9,298,549 B2 | 3/2016 | Camp et al. | |
| 9,621,934 B2 | 4/2017 | Seastrom et al. | |
| 2001/0002480 A1 * | 5/2001 | Dekoning | G06F 3/0626 |
| | | | 711/130 |
| 2002/0162076 A1 | 10/2002 | Talagala et al. | |
| 2003/0037071 A1 * | 2/2003 | Harris | G06F 11/2089 |
| 2003/0126315 A1 | 7/2003 | Tan et al. | |
| 2004/0133573 A1 | 7/2004 | Miloushev et al. | |
| 2004/0233078 A1 | 11/2004 | Takehara | |
| 2005/0027951 A1 | 2/2005 | Piccirillo et al. | |
| 2005/0044162 A1 | 2/2005 | Liang et al. | |
| 2005/0120267 A1 | 6/2005 | Burton et al. | |
| 2005/0144406 A1 | 6/2005 | Chong, Jr. | |
| 2005/0157697 A1 | 7/2005 | Lee et al. | |
| 2006/0112304 A1 | 5/2006 | Subramanian et al. | |
| 2006/0129559 A1 | 6/2006 | Sankaran et al. | |
| 2006/0264202 A1 | 11/2006 | Hagmeier et al. | |
| 2007/0028041 A1 | 2/2007 | Hallyal et al. | |
| 2007/0140692 A1 | 6/2007 | DeCusatis et al. | |
| 2007/0168693 A1 | 7/2007 | Pittman | |
| 2007/0174657 A1 | 7/2007 | Ahmadian et al. | |
| 2008/0060055 A1 | 3/2008 | Lau | |
| 2008/0137669 A1 | 6/2008 | Balandina et al. | |
| 2008/0201616 A1 | 8/2008 | Ashmore | |
| 2008/0281876 A1 | 11/2008 | Mimatsu | |
| 2009/0080432 A1 | 3/2009 | Kolakeri et al. | |
| 2009/0259882 A1 | 10/2009 | Shellhamer | |
| 2009/0313313 A1 | 12/2009 | Yokokawa et al. | |
| 2010/0107003 A1 | 4/2010 | Kawaguchi | |
| 2010/0114889 A1 | 5/2010 | Rabii et al. | |
| 2011/0109348 A1 | 5/2011 | Chen et al. | |
| 2011/0173350 A1 | 7/2011 | Coronado et al. | |
| 2011/0208994 A1 | 8/2011 | Chambliss et al. | |
| 2011/0213928 A1 | 9/2011 | Grube et al. | |
| 2011/0246819 A1 | 10/2011 | Callaway et al. | |
| 2011/0314218 A1 | 12/2011 | Bert | |
| 2012/0032718 A1 | 2/2012 | Chan et al. | |
| 2012/0059800 A1 | 3/2012 | Guo | |
| 2012/0096329 A1 | 4/2012 | Taranta, II | |
| 2012/0137098 A1 | 5/2012 | Wang et al. | |
| 2012/0166699 A1 | 6/2012 | Kumar et al. | |
| 2012/0166909 A1 | 6/2012 | Schmisseur et al. | |
| 2012/0201289 A1 | 8/2012 | Abdalla et al. | |
| 2012/0204032 A1 | 8/2012 | Wilkins et al. | |
| 2012/0213055 A1 | 8/2012 | Bajpai et al. | |
| 2012/0297272 A1 | 11/2012 | Bakke et al. | |
| 2012/0311255 A1 | 12/2012 | Chambliss et al. | |
| 2013/0060948 A1 | 3/2013 | Ulrich et al. | |
| 2013/0128721 A1 | 5/2013 | Decusatis et al. | |
| 2013/0128884 A1 | 5/2013 | Decusatis et al. | |
| 2013/0138759 A1 | 5/2013 | Chen et al. | |
| 2013/0148702 A1 | 6/2013 | Payne | |
| 2013/0227216 A1 | 8/2013 | Cheng et al. | |
| 2013/0246597 A1 | 9/2013 | Iizawa et al. | |
| 2013/0297976 A1 | 11/2013 | McMillen | |
| 2013/0311822 A1 | 11/2013 | Kotzur et al. | |
| 2013/0312082 A1 | 11/2013 | Izu et al. | |
| 2014/0067984 A1 | 3/2014 | Danilak | |
| 2014/0095865 A1 | 4/2014 | Yerra et al. | |
| 2014/0115232 A1 | 4/2014 | Goss et al. | |
| 2014/0136799 A1 | 5/2014 | Fortin | |
| 2014/0269731 A1 | 9/2014 | Decusatis et al. | |
| 2014/0281688 A1 | 9/2014 | Tiwari et al. | |
| 2014/0304469 A1 | 10/2014 | Wu | |
| 2014/0331297 A1 | 11/2014 | Innes et al. | |
| 2015/0012699 A1 | 1/2015 | Rizzo et al. | |
| 2015/0095596 A1 | 4/2015 | Yang et al. | |
| 2015/0146614 A1 | 5/2015 | Yu et al. | |
| 2015/0199244 A1 * | 7/2015 | Venkatachalam | G06F 11/1666 |
| | | | 714/6.3 |
| 2015/0288752 A1 | 10/2015 | Voigt | |
| 2016/0034186 A1 | 2/2016 | Weiner et al. | |
| 2016/0170833 A1 | 6/2016 | Segura et al. | |
| 2016/0196182 A1 | 7/2016 | Camp et al. | |
| 2016/0226508 A1 | 8/2016 | Kurooka et al. | |
| 2017/0253269 A1 | 9/2017 | Kanekawa et al. | |
| 2017/0302409 A1 | 10/2017 | Sherlock | |
| 2017/0346742 A1 | 11/2017 | Shahar et al. | |

FOREIGN PATENT DOCUMENTS

| | | |
|---|---|---|
| CN | 104333358 A | 2/2015 |
| EP | 1347369 B1 | 11/2012 |
| IN | 1546/MUM/2013 | 3/2015 |
| TW | 201346530 A | 11/2013 |
| WO | 02/91689 A1 | 11/2002 |
| WO | 2014/120136 A1 | 8/2014 |

OTHER PUBLICATIONS

Xingyuan, T. et al., "An Offset Cancellation Technique in a Switched-Capacitor Comparator for SAR ADCs"; (Research Paper), „Journal of Semiconductors 33.1. „Jan. 2012, 5 pages, http://www.jos.ac.cn/bdtxbcn/ch/reader/create_pdf.aspx?file_no=11072501.

(56) References Cited

OTHER PUBLICATIONS

Razavi, B. et al., "Design Techniques for High-Speed, High-Resolution Comparators," (Research Paper). IEEE Journal of Solid-State Circuits 27.12, Dec. 12, 1992, pp. 1916-1926, http://www.seas.ucla.edu/brweb/papers/Journals/R%26WDec92_2.pdf.
PCT; "International Search Report and Written Opinion"; cited in Appl. No. PCT/US2015/013898; dated Oct. 8, 2015; 11 pages.
Mao, Y. et al., A New Parity-based Migration Method to Expand Raid-5, (Research Paper), Nov. 4, 2013, 11 Pages.
Li, M. et al.: Toward I/O-Efficient Protection Against Silent Data Corruptions in RAID Arrays, (Research Paper); Jun. 2-6, 2014; 12 Pages.
Kimura et al., "A 28 Gb/s 560 mW Multi-Standard SerDes With Single-Stage Analog Front-End and 14-Tap Decision Feedback Equalizer in 28 nm CMOS," IEEE Journal of Solid-State Circuits, vol. 49, No. 12, Dec. 2014, pp. 3091-3103.
International Search Report and Written Opinion; PCT/US2015/013921; dated Oct. 28, 2015; 12 pages.
International Search Report and Written Opinion received for PCT Patent Application No. PCT/US2015/013921, dated Oct. 28, 2015, 10 pages.
International Search Report and Written Opinion received for PCT Patent Application No. PCT/US2014/053704, dated May 15, 2015, 11 pages.
International Search Report and Written Opinion received for PCT Patent Application No. PCT/US2014/049193, dated Feb. 26, 2015, 8 pages.
International Preliminary Report on Patentability received for PCT Patent Application No. PCT/US2015/013921, dated Aug. 10, 2017, 9 pages.
International Preliminary Report on Patentability received for PCT Patent Application No. PCT/US2015/013817, dated Aug. 10, 2017, 9 pages.
International Preliminary Report on Patentability received for PCT Patent Application No. PCT/US2014/053704, dated Mar. 16, 2017, 10 pages.
International Preliminary Report on Patentability received for PCT Patent Application No. PCT/US2014/049193, dated Feb. 9, 2017, 7 pages.
Amiri, K. et al., Highly Concurrent Shared Storage, (Research Paper), Sep. 7, 1999, 25 Pages.
Almeida, P. S., et al; Scalable Eventually Consistent Counters Over Unreliable Networks; Jul. 12, 2013; 32 Pages.
Kang, Y. et al., "Fault-Tolerant Flow Control in On-Chip Networks," (Research Paper), Proceedings for IEEE, May 3-6, 2010, 8 pages, available at http://citeseerx.ist.psu.edu/viewdoc/download?doi=10.1.1.228.7865&rep=rep1&type=pdf.
International Searching Authority, The International Search Report and the Written Opinion, dated Feb. 26, 2015, 10 Pages.
International Search Report and Written Opinion received for PCT Patent Application No. PCT/US2015/023708, dated Apr. 22, 2016, 11 pages.
International Search Report and Written Opinion received for PCT Patent Application No. PCT/US2014/062196, dated Jun. 30, 2015, 13 pages.
International Preliminary Report on Patentability received for PCT Patent Application No. PCT/US2015/023708, dated Oct. 12, 2017, 10 pages.
International Preliminary Report on Patentability received for PCT Patent Application No. PCT/US2015/013898, dated Aug. 10, 2017, 8 pages.
International Preliminary Report on Patentability received for PCT Patent Application No. PCT/US2014/062196, dated May 4, 2017, 12 pages.
EMC2; High Availability and Data Protection with EMC Isilon Scale-out NAS, (Research Paper); Nov. 2013; 36 Pages.
Do I need a second RAID controller for fault-tolerance ?, (Research Paper); Aug. 22, 2010; 2 Pages; http://serverfault.com/questions/303869/do-i-need-a-second-raid-controller-for-fault-tolerance.

* cited by examiner

PREVENTING DATA CORRUPTION AND SINGLE POINT OF FAILURE IN A FAULT-TOLERANT MEMORY

BACKGROUND

Current data storage devices such as volatile and non-volatile memory often include fault tolerance mechanisms to ensure that data remains available in the event of a device error or failure. An example of a fault tolerance mechanism provided to current data storage devices is a redundant array of independent disks (RAID). RAID is a storage technology that controls multiple memory modules and provides fault tolerance by storing data with redundancy. RAID technology may store data with redundancy in a variety of ways. Examples of redundant data storage include duplicating data and storing the data in multiple memory modules and adding parity to store calculated error recovery bits. The multiple memory modules, which may include the data and associated parity, may be accessed concurrently by multiple redundancy controllers.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
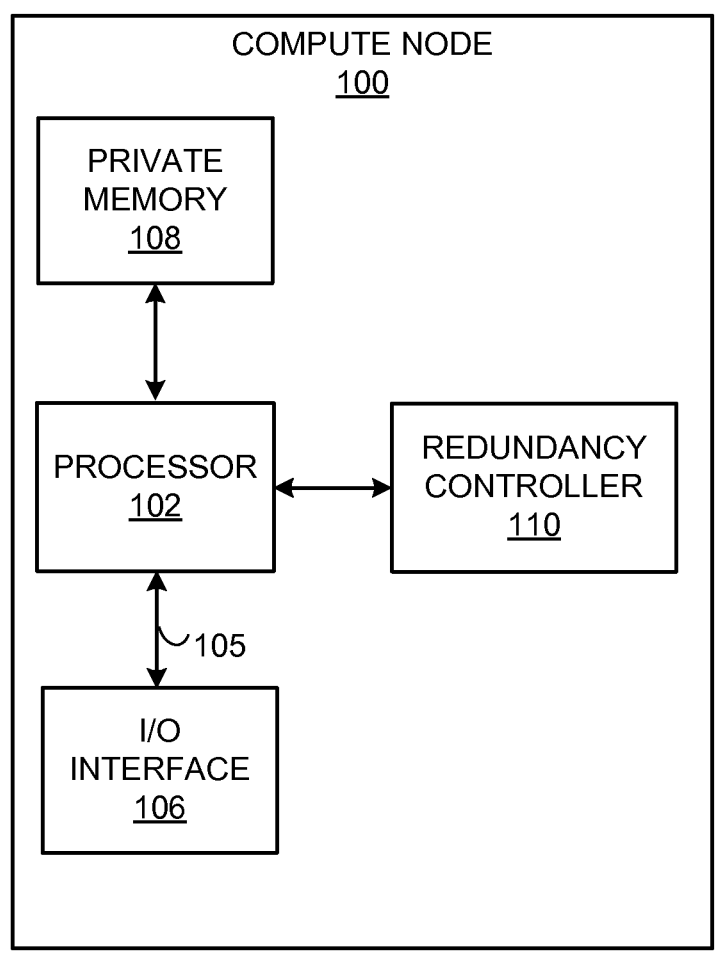
FIG. 1A shows a simplified block diagram of a compute node to prevent data corruption and a single point of failure in a fault-tolerant memory fabric, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

In addition, the following terms will be used throughout the remainder of the present disclosure. The term fabric may mean some combination of interconnected fabric devices used to convey packet-based information between endpoint components. The term memory fabric may mean a fabric used, at least in part, to provide connectivity between redundancy controllers and media controllers. The term protocol may mean the packet level semantic convention used by protocol agents. The term protocol agents may mean endpoints (e.g., producers and consumers of data) that communicate with each other over a memory fabric. The terms request or request packet may mean a packet sent from a redundancy controller to a media controller, usually indicating a desired memory activity such as a read or a write. The terms response or response packet may mean a packet sent from a media controller back to a redundancy controller from which it earlier received a request. The response may indicate completion of the requested activity, supply memory read data, error status, etc. The response also implicitly acknowledges that the original request was received by the media controller.

The term redundancy controller may mean a requesting protocol agent that acts on behalf of a central processing unit (CPU), input output (I/O) device, or other user of memory, and generates requests such as read and write requests to one or more responding protocol agents (e.g., media controllers). The redundancy controller may be the attachment point where producers or consumers of data attach to the fabric. The redundancy controller may communicate with multiple media controllers and may implement redundant storage of data across more than one media controller on behalf of a CPU, I/O device, etc., such that the failure of a subset of the media controllers will not result in loss of data or interruption of system operation. The term media controller may mean a responding protocol agent that connects memory or storage devices to a memory fabric. The media controller may receive requests such as read and write requests, control the memory or storage devices, and return corresponding responses. The media controller may be the attachment point where data storage attaches to the memory fabric.

The term command may mean a transaction sent from a processor, I/O device or other source to a redundancy controller, which causes the redundancy controller to issue a sequence. The term primitive may mean a single request issued by a redundancy controller to a media controller along with its corresponding response from the media controller back to the redundancy controller. The term sequence may mean an ordered set of primitives issued by a redundancy controller to one or more media controllers to execute a command received from a processor, I/O device or other source. The term locked sequence may mean a sequence that requires atomic access to multiple media controllers. The term cacheline may mean a unit of data that may be read from or written to a media controller by a redundancy controller. The term is not intended to be restrictive. The cacheline may include any type or size of data, such as a disk sector, a solid-state drive (SSD block), a RAID block or a processor cacheline. The term stripe may mean a set of one or more data cachelines, and associated redundancy information stored in one or more parity cachelines, which are distributed across multiple memory modules. The term RAID may mean a use of multiple media controllers each with its own memory devices, to store redundant data in a manner such that the failure of a single media controller or its memory devices will not result in loss of data, nor loss of access to data. Variations which tolerate the failure of a larger number of media controllers or memory devices are also covered by this term. The term single point of failure may mean an architecture in which the failure of a single redundancy controller can prevent the continued operation of other redundancy controllers, or continued accessibility of the data.

Disclosed herein are examples of methods to prevent data corruption and a single point of failure in a fault-tolerant memory fabric with multiple redundancy controllers. Fault tolerant memory fabric, for instance, may include memory using redundant array of independent disks (RAID) technology. Moreover, the disclosed fault-tolerant memory fabric may allow multiple independent redundancy controllers to concurrently and asynchronously access a shared or otherwise aggregated pool of RAID storage, which may span across multiple media controllers. The multiple independent redundancy controllers may concurrently and asynchronously access the RAID storage by using a stripe lock implemented on the media controllers to serialize hazardous conflicting operations and eliminate race-condition hazards for example.

In accordance with the disclosed examples, the integrity of the RAID-protected data is guaranteed even in the event of a failure or unplanned outage of one or more of the redundancy controllers. The disclosed examples ensure that surviving redundancy controllers continue to have uninterrupted access to the RAID data and that the RAID data is not corrupted or otherwise invalidated by the failure of the faulty redundancy controller.

A distributed fault-tolerant memory fabric containing multiple redundancy controllers and multiple media controllers may be susceptible to a single point of failure or silent data corruption in the event of a redundancy controller failure. A loss of access to data may result from other redundancy controllers waiting forever for a failed redundancy controller to release its lock on the stripe. Silent data corruption may result from inconsistent data and parity values due to interrupted locked RAID sequences from a failed redundancy controller. Corruption occurs if, at any point in the future, the inconsistent parity is relied upon to reconstruct any of the data cachelines in the stripe.

The technical benefits and advantages of the present disclosure include providing high availability across multiple redundancy controllers that share distributed and redundant RAID storage. The disclosed examples may eliminate single point of failure that may exist in a fault-tolerant memory fabric with a centralized redundancy controller. Furthermore, the disclosed examples may eliminate loss of access to data and loss of data risks that may occur a fault-tolerant memory fabric.

With reference to FIG. 1A, there is shown a block diagram of a compute node (e.g., computing device, input/output (I/O) server node) 100 for preventing data corruption and a single point of failure in a fault-tolerant memory according to an example of the present disclosure. It should be understood that the compute node 100 may include additional components and that one or more of the components described herein may be removed and/or modified without departing from a scope of the compute node 100.

For example, the compute node 100 may include a processor 102, an input/output interface 106, a private memory 108, and a redundancy controller 110. In one example, the compute node 100 is a server but other types of compute nodes may be used. The compute node 100 may be a node of a distributed data storage system. For example, the compute node 100 may be part of a cluster of nodes that services queries and provides data storage for multiple users or systems, and the nodes may communicate with each other to service queries and store data. The cluster of nodes may provide data redundancy to prevent data loss and minimize down time in case of a node failure.

The processor 102 may be a microprocessor, a microcontroller, an application specific integrated circuit (ASIC), field programmable gate array (FPGA), or other type of circuit to perform various processing functions. The private memory 108 may include volatile dynamic random access memory (DRAM) with or without battery backup, non-volatile phase change random access memory (PCRAM), spin transfer torque-magnetoresistive random access memory (STT-MRAM), resistive random access memory (reRAM), memristor, FLASH, or other types of memory devices. For example, the memory may be solid state, persistent, dense, fast memory. Fast memory can be memory having an access time similar to DRAM memory. The I/O interface 106 may include a hardware and/or a software interface. The I/O interface 106 may be a network interface connected to a network, such as the Internet, a local area network, etc. The compute node 100 may receive data and user-input through the I/O interface 106. Where examples herein describe redundancy controller behavior occurring in response to commands issued by the processor 102, this should not be taken restrictively. The examples are also applicable if such commands are issued by an I/O device via interface 106.

The components of computing node 100 may be coupled by a bus 105, where the bus 105 may be a communication system that transfers data between the various components of the computing device 100. In examples, the bus 105 may be a Peripheral Component Interconnect (PCI), Industry Standard Architecture (ISA), PCI-Express, HyperTransport®, NuBus, a proprietary bus, and the like. Alternatively, the processor 102 may use multiple different fabrics to communicate with the various components, such as PCIe for I/O, DDR3 for memory, and QPI for the redundancy controller.

The redundancy controller 110, for example, may act on behalf of the processor 102 and generate sequences of primitives such as read, write, swap, XOR, lock, unlock, etc. requests to one or more responding protocol agents (e.g., media controllers 120A-M) as discussed further below with respect to FIG. 1B. The redundancy controller 110 may communicate with multiple ones of the media controllers 120A-M, in which "M" represents an integer value greater than one, and may implement redundant storage of data across more than one media controller on behalf of the processor 102 such that the failure of a subset of the media controllers 120A-M will not result in loss of data or interruption of system operation. The redundancy controller 110, for example, may generate certain sequences of primitives independently, not directly resulting from processor commands. These include sequences used for scrubbing, initializing, migrating, or error-correcting memory.

Figure 1B:
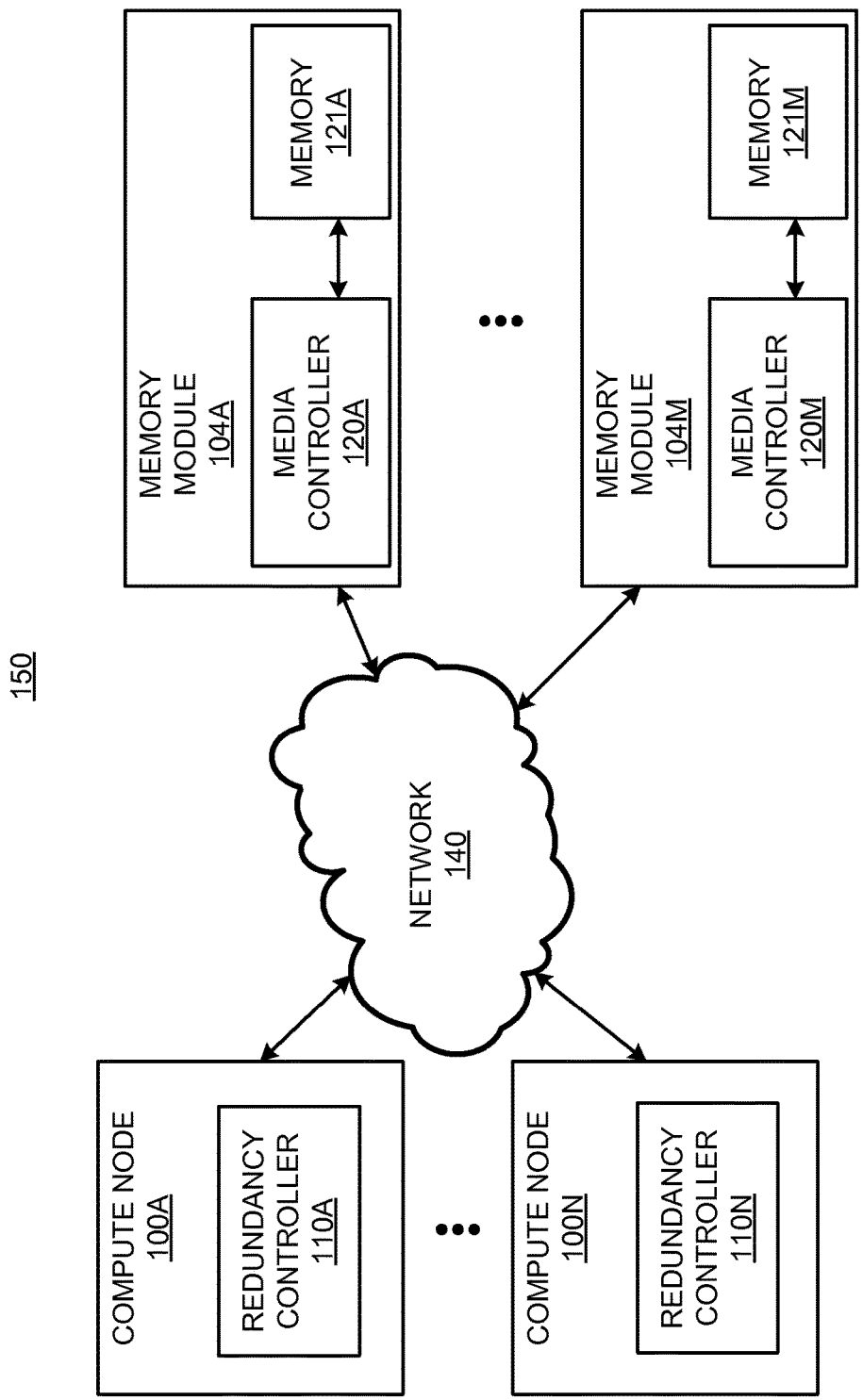
FIG. 1B shows a simplified block diagram of a fault tolerant system to prevent data corruption and a single point of failure in a fault-tolerant memory fabric, according to an example of the present disclosure.

With reference to FIG. 1B, there is shown a block diagram of a fault tolerant system 150 according to an example of the present disclosure. It should be understood that the system 150 may include additional components and that one or more of the components described herein may be removed and/or modified without departing from a scope of the system 150. The system 150 may include multiple compute nodes 100A-N (where the number of compute nodes is greater than or equal to 1), a network 140, and memory modules 104A-M.

The multiple compute nodes 100A-N may be coupled to the memory modules 104A-M through the network 140. The memory modules 104A-M may include media controllers 120A-M and memories 121A-M. Each media controller, for instance, may communicate with its associated memory and control access to the memory by the redundancy controllers 110A-N, which in turn are acting on behalf of the processors. The media controllers 120A-M provide access to regions of memory. The regions of memory are accessed by multiple redundancy controllers in the compute nodes 100A-N using access primitives such as read, write, lock, unlock, swap, XOR, etc. In order to support aggregation or sharing of memory, media controllers 120A-M may be accessed by multiple redundancy controllers (e.g., acting on behalf of multiple servers). Thus, there is a many-to-many relationship between redundancy controllers and media controllers. Each of the memories 121A-M may include volatile dynamic random access memory (DRAM) with battery backup, non-volatile phase change random access memory (PCRAM), spin transfer torque-magnetoresistive random access memory (STT-MRAM), resistive random access memory (reRAM), memristor, FLASH, or other types of memory devices. For example, the memory may be solid state, persistent, dense, fast memory. Fast memory can be memory having an access time similar to DRAM memory.

As described in the disclosed examples, the redundancy controllers 110A-N may maintain fault tolerance across the memory modules 104A-M. The redundancy controller 110 may receive commands from one or more processors 102, I/O devices, or other sources. In response to receipt of these commands, the redundancy controller 110 generates sequences of primitive accesses to multiple media controllers 120A-M. The redundancy controller 110 may also generate certain sequences of primitives independently, not directly resulting from processor commands. These include sequences used for scrubbing, initializing, migrating, or error-correcting memory. The media controllers 120A-M may then respond to the requested primitives with a completion message.

RAID stripe locks acquired and released by the redundancy controller 110 guarantee atomicity for locked sequences. Accordingly, the shortened terms "stripe" and "stripe lock" has been used throughout the text to describe RAID stripes and locks on RAID stripes, respectively. For any given stripe, actual manipulation of the locks, including request queueing, lock ownership tracking, granting, releasing, and breaking, may be managed by the media controller that stores the parity cacheline for the stripe. Locking and unlocking is coordinated between the redundancy controllers and the relevant media controllers using lock and unlock primitives, which include lock and unlock request and completion messages. Media controllers 120A-M implement lock semantics on a per-cacheline address basis. Cachelines that represent stripe parity storage receive lock and unlock primitives from redundancy controllers, while those that represent data storage do not receive lock and unlock primitives. By associating locks with cacheline addresses, media controllers 120A-M may participate in the locking protocol without requiring explicit knowledge about the stripe layouts implemented by the redundancy controllers. Where the term "stripe lock" is used herein in the context of media controller operation, this should not be taken to imply any knowledge by the media controller of stripe layout. Media controllers 120A-M may identify requests to a locked stripe by address only, without regard to the stripe layout.

Figure 2A:
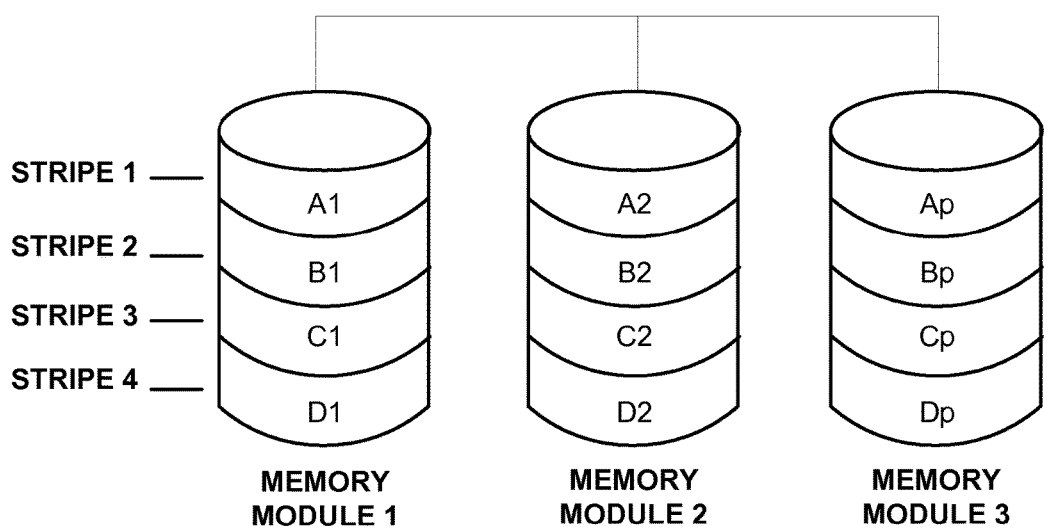
FIG. 2A shows RAID stripes across multiple memory modules in a fault-tolerant memory fabric, according to an example of the present disclosure.

Referring to FIG. 2A, the fault tolerant scheme of the disclosed examples may use memory associated with multiple memory modules (memory module 1, memory module 2, and memory module 3) to store RAID blocks A1-Dp, in which "p" represents an integer value greater than one. According to this example, each RAID block may include a single cacheline. A cacheline is the largest unit of data that can be atomically read or written to a memory module. A cacheline could be of any size used by processors, such as 64 bytes. The use of a single cacheline RAID block size should not be taken restrictively. Cachelines A1, A2, B1, B2, C1, C2, D1, and D2 represent data cachelines that are distributed across memory module 1 and memory module 2. Cachelines Ap, Bp, Cp, and Dp represent parity cachelines that are stored in memory module 3. The parity cachelines provide redundancy for the data cachelines.

A stripe may include a combination of data cachelines from at least one memory module and parity cachelines from at least one other memory module. In other words, a stripe may include memory blocks distributed across multiple modules which contain redundant information, and must be atomically accessed to maintain the consistency of the redundant information. For example, one stripe may include cachelines A1, A2, and Ap (stripe 1), another stripe may include cachelines B1, B2, and Bp (stripe 2), another stripe may include cachelines C1, C2, and Cp (stripe 3), and another stripe may include cachelines D1, D2, and Dp (stripe 4). The data cachelines in a stripe may or may not be sequential in the address space of the processor 102. A RAID memory group may include stripes 1-4. The example in FIG. 2A represents a RAID-4 configuration, where all parity cachelines are stored on a single memory module. Other RAID configurations, such as RAID-1 where the parity cachelines are mirrors of the data cachelines, and RAID-5 where parity cachelines distributed across all memory modules, and other redundancy schemes are also covered by the present disclosure.

According to this example, if memory module 1 fails, the data cachelines from memory module 2 may be combined with the corresponding-stripe parity cachelines from memory module 3 (using the boolean exclusive-or function) to reconstruct the missing cachelines. For instance, if memory module 1 fails, then stripe 1 may be reconstructed by performing an exclusive-or function on data cacheline A2 and parity cacheline Ap to determine data cacheline A1. In addition, the other stripes may be reconstructed in a similar manner using the fault tolerant scheme of this example. In general, a cacheline on a single failed memory module may be reconstructed by using the exclusive-or function on the corresponding-stripe cachelines on all of the surviving memory modules. The use of the simple exclusive-or operation in the reconstruction of missing data should not be taken restrictively. Different data-recovery operations may involve different mathematical techniques. For example, RAID-6 commonly uses Reed-Solomon codes.

Figure 2B:
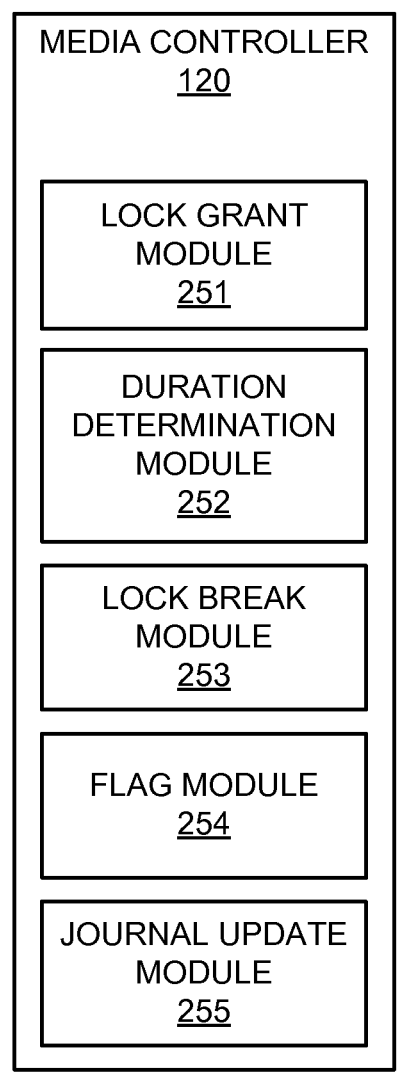
FIG. 2B shows a media controller according to an example of the present disclosure.

FIG. 2B shows a media controller 120 according to an example of the present disclosure. The media controller 120 in this example may be media controller 120B for a memory module that stores a parity cacheline as discussed further below. The media controller 120 may include and process the functions of a lock grant module 251, a duration determination module 252, a lock break module 253, a flag module 254, and a journal update module 255.

The lock grant module 251 may grant a first lock for a stripe to a requesting redundancy controller. The duration determination module 252 may determine if a duration of the lock has exceeded a predetermined time threshold. In response to a determination that the duration of the lock exceeded the predetermined time threshold, the lock break module 253 may break the lock of the stripe, the flag module 254 may flag a parity cacheline of the stripe as invalid, and the journal update module 255 may update a journal to document the breaking of the lock. In this example, modules 251-255 are circuits implemented in hardware. In another example, the functions of modules 251-255 may be machine readable instructions stored on a non-transitory computer readable medium and executed by a processor, as discussed further below in FIG. 9.

Figure 3:
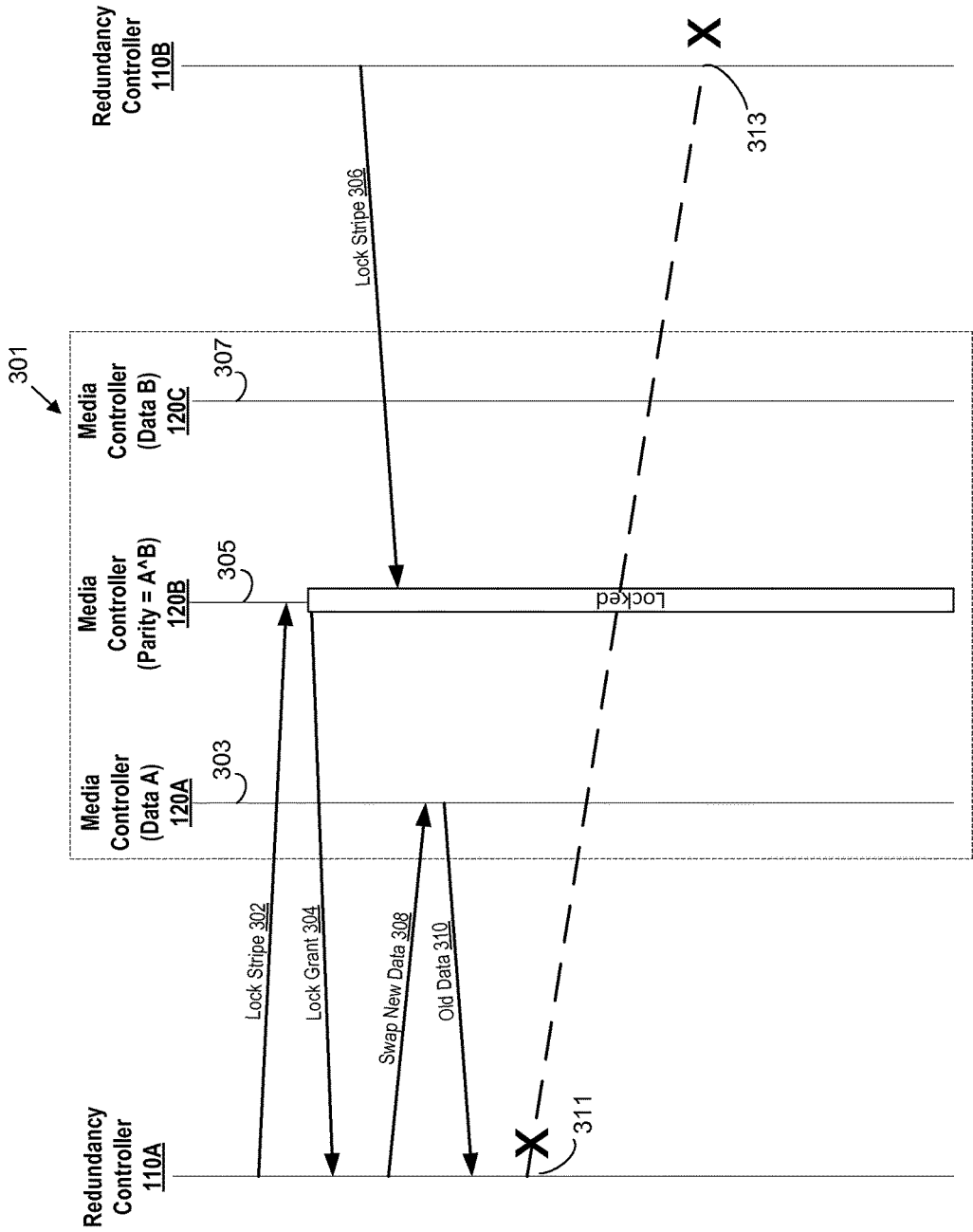
FIG. 3 shows a bounce diagram of a redundancy controller failure during a stripe lock sequence according to an example of the present disclosure.

FIG. 3 shows a bounce diagram of a redundancy controller failure during a stripe lock sequence, according to an example of the present disclosure. Redundancy controllers 110A-B and media controllers 120A-C are depicted in FIG. 3. Redundancy controllers 110A-B access a stripe 301 that includes data cachelines stored in the first and second memory modules 303, 307 and a parity cacheline stored in the third memory module 305.

At arc 302, redundancy controller 110A may request a first lock from media controller 120B, which hosts the parity cacheline to perform a sequence to modify the stripe 301. Since there is no single point of serialization with concurrent redundancy controllers 110A and 110B, a point of serialization may be created at media controller 120B of the parity memory module 305. The point of serialization may be created at media controller 120B because any sequence that modifies the stripe 301 must communicate with memory module 305, because it is the memory module hosting the parity cacheline for the stripe 301. As a common resource accessed by both redundancy controllers 110A and 110B when accessing stripe 301, media controller 120B of memory module 305 becomes the point of serialization for stripe 301.

According to an example, the lock may be an active queue inside media controller 120B. The active queue may include a stripe-specific flag or bit that indicates whether the stripe 301 is currently is locked. That is, the media controller of the parity memory module may (i) keep track of all pending lock requests for a stripe, grant the lock requests one at a time so that each requestor gets a turn in sequence to hold the lock for that stripe and (ii) perform this independently for unrelated stripes. In this regard, any subsequent lock requests from other redundancy controllers to the locked stripe are in conflict and may be added to a conflict queue for later granting when the current lock is released. As an example, each media controller may implement a first in, first out (FIFO), conflict queue for each cacheline address, or a similar algorithm to ensure that each sequence eventually acquires the stripe-lock and makes forward progress. Media controllers may associate locks with cacheline addresses, since parity cachelines on the same memory module exist at different cacheline addresses. Media controllers can thus manage locks for stripes, without requiring any detailed knowledge of the layout of the stripes.

At arc 304, media controller 120B has determined that the stripe 301 is not locked and grants the first lock to redundancy controller 110A. As a result, a subsequent lock request from redundancy controller 110B to media controller 120B at arc 306 is in conflict with the first lock and is therefore added to the conflict queue until the first lock is released.

At arc 308, redundancy controller 110A may, for example, issue a swap primitive to media controller 120A of the first data memory module 303 in stripe 301. The swap primitive is a primitive that reads the old data, and then writes the new data to the first data memory module 303 in one merged primitive. As such, redundancy controller 110 requests to swap new data with old data at arc 308 and may receive a response packet with the old data from the media controller 120A as shown at arc 310. Alternatively, the redundancy controller 110 may issue separate read and write primitives to the media controller 120A in this example.

Nevertheless, redundancy controller 110A, may experience a failure at point 311 prior to completing the sequence to modify the stripe 301, which includes updating the parity memory module 305 and releasing the lock. In this scenario, redundancy controller 110B eventually fails at point 313 from a timeout because the first lock is never released. That is, redundancy controller 110B eventually fails at point 313 because of the failure of redundancy controller 110A prior to releasing the first lock of the stripe 301. Thus, there exists a single point of failure (SPOF), and thus, redundancy controller 110B and other operational redundancy controllers are adversely affected by the single failed redundancy controller 110A.

The methods disclosed below in FIGS. 4-8 describe examples of methods for preventing a single point of failure and resulting data corruption in a fault-tolerant memory fabric with multiple redundancy controllers. It should be apparent to those of ordinary skill in the art that the methods 400-800 represent generalized illustrations and that other sequences may be added or existing sequences may be removed, modified or rearranged without departing from the scopes of the methods 400-800.

Figure 4:
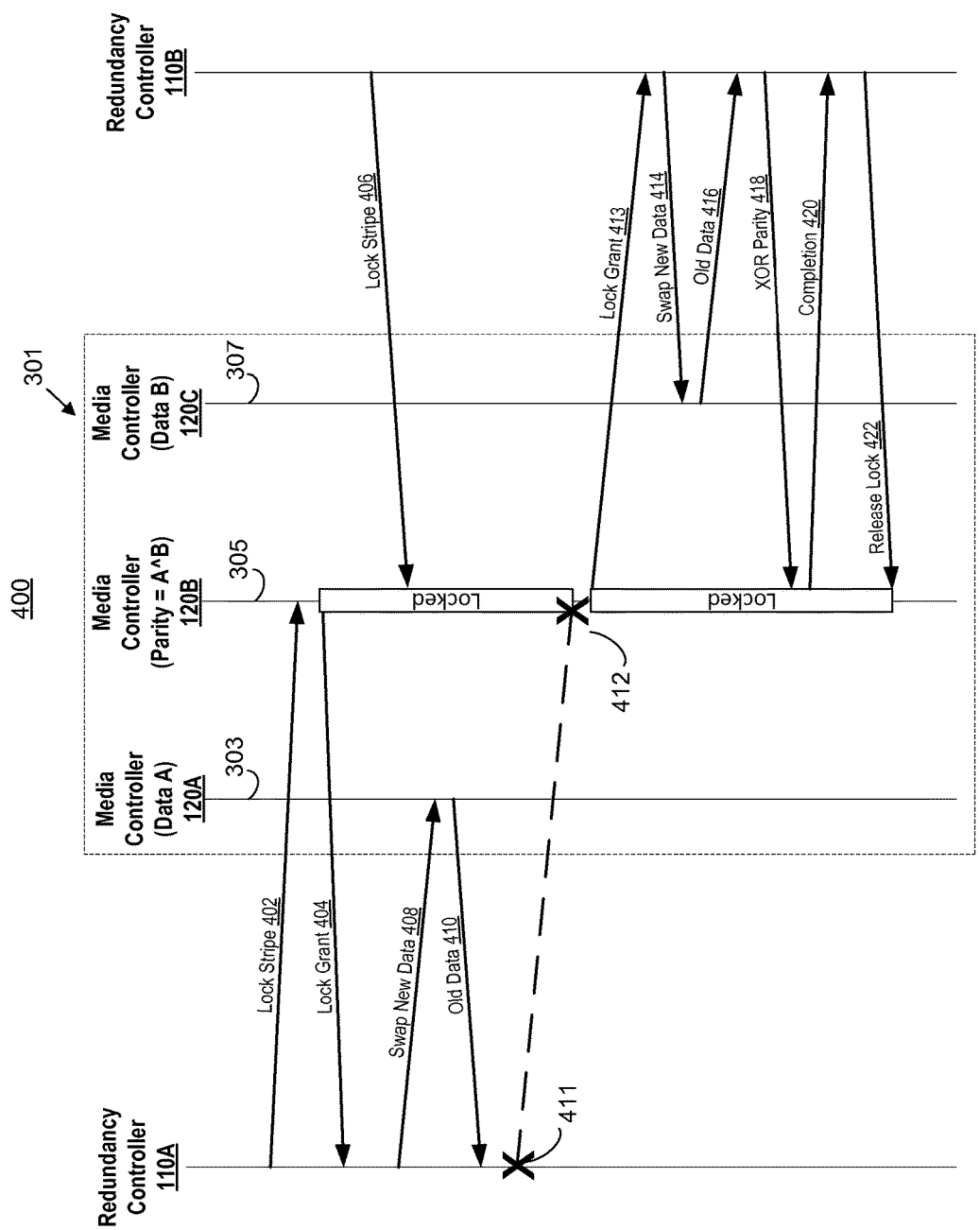
FIG. 4 shows a bounce diagram of a method for breaking a stripe lock due to an expiration of a lock timer, according to an example of the present disclosure.

FIG. 4 shows a bounce diagram of a method 400 for breaking a stripe lock due to an expiration of a lock timer, according to an example of the present disclosure. This method 400 may be implemented on media controller 120B to restore forward-progress to redundancy controller 110B in the scenario that redundancy controller 110A fails prior to releasing a lock of stripe 301.

At arc 402, redundancy controller 110A may request a first lock from media controller 120B, which hosts the parity cacheline to perform a sequence to modify the stripe 301. At arc 404, media controller 120B may grant the first lock to redundancy controller 110A. As a result, a subsequent lock request from redundancy controller 110B to media controller 120B at arc 406 is in conflict with the first lock and is therefore added to the conflict queue until the first lock is released.

Redundancy controller 110A may issue a swap primitive to media controller 120A of the first data memory module 303 at arc 408 and may receive a response packet with the old data from the media controller 120A as shown at arc 410. Redundancy controller 110A, however, may experience a failure at point 411 prior to completing the sequence to modify the stripe 301, which includes updating the parity memory module 305 and releasing the lock.

In this scenario, after determining that a duration of the first lock has exceeded a predetermined time threshold (e.g. a lock timer), media controller 120B may break the first lock at arc 412 and grant a second lock to redundancy controller 110B for stripe 301 as shown at arc 413. In this regard, redundancy controller 110B does not fail due to a timeout since the first lock is broken by media controller 120B.

Accordingly, redundancy controller 110B may begin to perform a sequence to modify stripe 301. Redundancy controller 110B may issue a swap primitive to media controller 120C of the second data memory module 307 at arc 414 and may receive a response packet with the old data from the media controller 120C as shown at arc 416. Redundancy controller 110B may issue a non-idempotent exclusive-or (XOR) (e.g., a merged parity read primitive and parity write primitive) at arc 418, receive a completion message from media controller 120B at arc 420, and then release the second lock at arc 422. However, in this example, a parity cacheline in memory module 305 may be incorrect and silent data corruption may occur because there is no record that the first lock on stripe 301 was broken due to the failure of redundancy controller 110A. In other words, the data and the parity cacheline in stripe 301 may be inconsistent because redundancy controller 110A only partially completed a stripe sequence to modify stripe 301 prior to failing.

Figure 5:
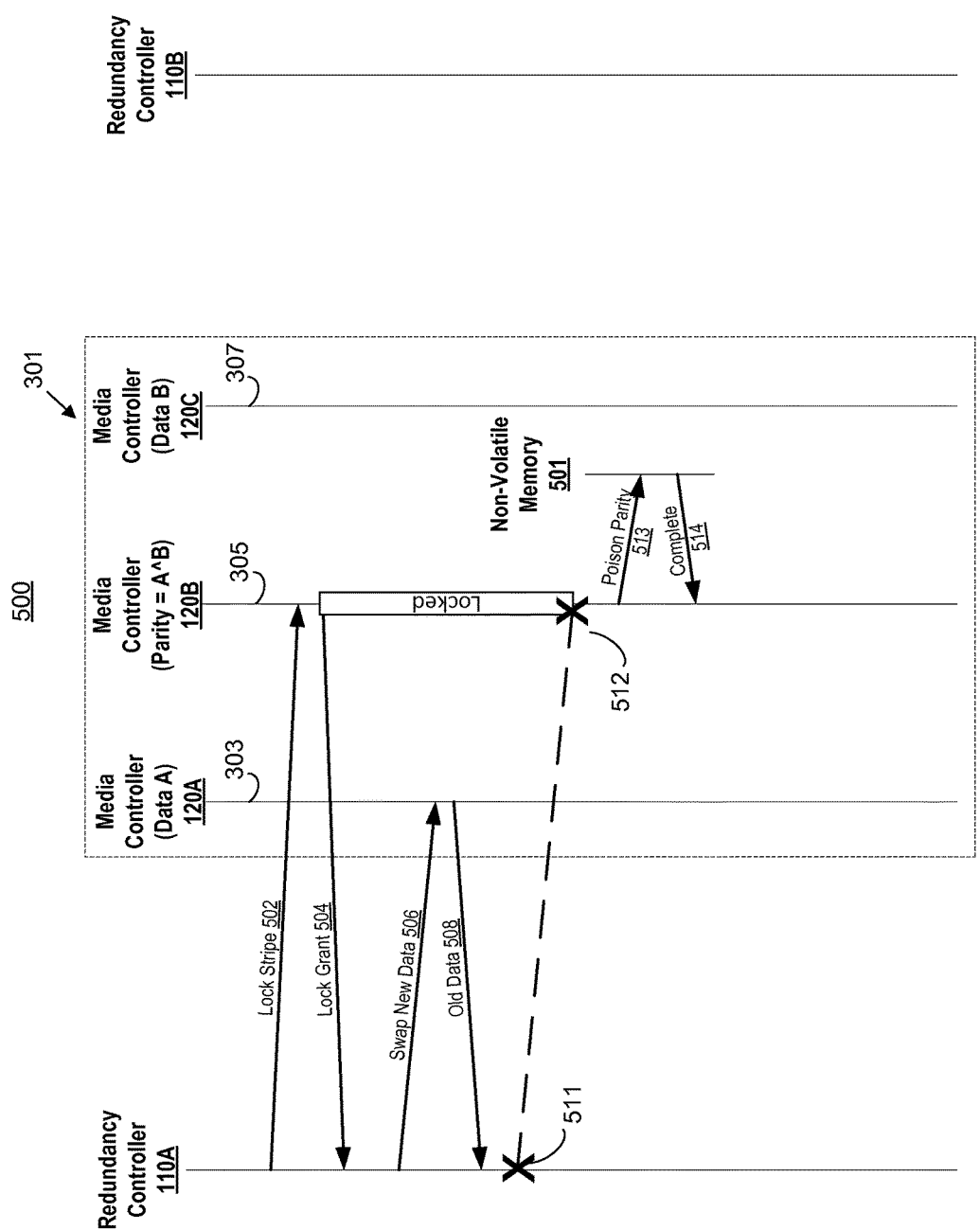
FIG. 5 shows a bounce diagram of a method to poison a parity cacheline, according to an example of the present disclosure.

FIG. 5 shows a bounce diagram of a method 500 to poison a parity cacheline of the parity memory module 305, according to an example of the present disclosure. In response to the breaking of the first stripe lock as discussed above in method 400, the method 500 may poison the parity cacheline to prevent future use of the invalid parity cacheline before it is rebuilt.

At arc 502, redundancy controller 110A may request a first lock from media controller 120B, which hosts the parity cacheline to perform a sequence to modify the stripe 301. At arc 504, media controller 120B may grant the first lock to redundancy controller 110A. Redundancy controller 110A may issue a swap primitive to media controller 120A of the first data memory module 303 at arc 506 and may receive a response packet with the old data from the media controller 120A as shown at arc 508. Redundancy controller 110A, however, may experience a failure at point 511 prior to completing the sequence to modify the stripe 301, which includes updating the parity memory module 305 and releasing the lock.

In this scenario, after determining that a duration of the first lock has exceeded a predetermined time threshold (e.g. a lock timer), media controller 120B may break the first lock at arc 512 and poison a parity cacheline in non-volatile memory 501 of parity memory module 305 as shown at arc 513. The parity cacheline may be poisoned by media controller 120B, for instance, by flagging the parity cacheline as invalid in the non-volatile memory 501. In this example, the parity cacheline in parity memory module 305 is incorrect, however, silent data corruption may be prevented because the parity cacheline is poisoned for stripe 301 to prevent future use of the parity cacheline before it is rebuilt as further discussed in FIG. 7 below. As shown at arc 514, the media controller 120B may then receive a completion message from the non-volatile memory 501 of parity memory module 305. At this point, however, the stripe 301 is no longer protected by parity redundancy.

Figure 6:
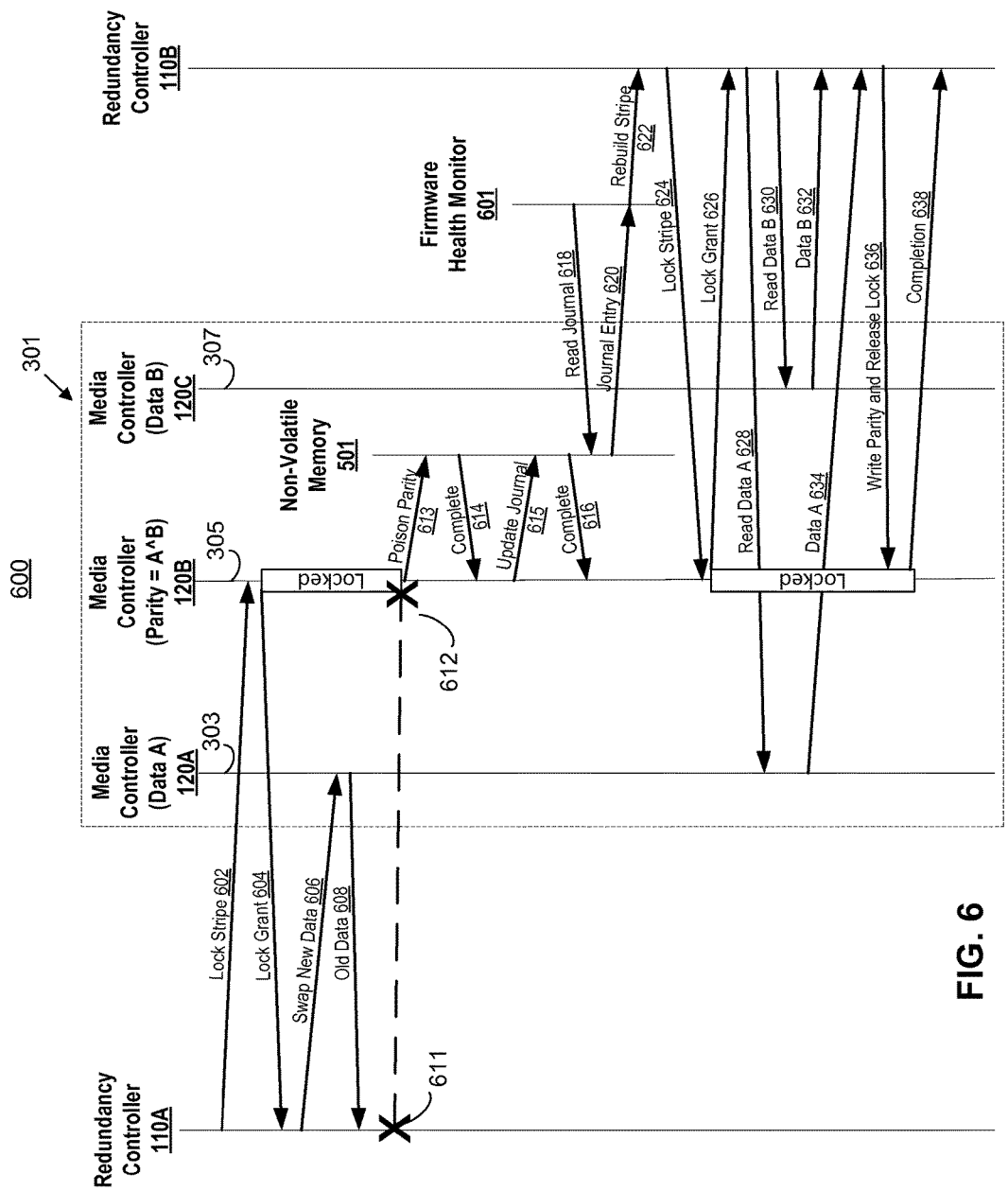
FIG. 6 a bounce diagram of a method to document a broken stripe lock in a persistent journal, according to an example of the present disclosure.

FIG. 6 shows a bounce diagram of a method 600 to document a broken stripe lock in a persistent journal, according to an example of the present disclosure. The method 600 may document that a stripe lock has been broken due to a timeout in the persistent journal to notify a firmware health monitor 601 that the stripe 301 has been compromised. As a result, this notification allows the firmware health monitor 601 trigger a rebuild of the stripe 301 in a timely manner to prevent data loss. For instance, a data loss may occur if a second data failure occurs before the parity cacheline is rebuilt.

At arc 602, redundancy controller 110A may request a first lock from media controller 120B, which hosts the parity cacheline to perform a sequence to modify the stripe 301. At arc 604, media controller 120B may grant the first lock to redundancy controller 110A. Redundancy controller 110A may issue a swap primitive to media controller 120A of the first data memory module 303 at arc 606 and may receive a response packet with the old data from the media controller 120A as shown at arc 608. Redundancy controller 110A, however, may experience a failure at point 611 prior to completing the sequence to modify the stripe 301, which includes updating the parity memory module 305 and releasing the lock.

In this scenario, after determining that a duration of the first lock has exceeded a predetermined time threshold, media controller 120B may break the first lock at arc 612 and poison a parity cacheline in non-volatile memory 501 of parity memory module 305 as shown at arc 613. As a result, the non-volatile memory 501 may respond with a completion message at arc 614. According to an example, the media controller 120B may document that the first lock has been broken in a persistent journal in the non-volatile memory 501 of the parity memory module 305 as shown at arc 615 and receive a completion message from the non-volatile memory 501 at arc 616.

Meanwhile, the firmware health monitor 601 may periodically poll or read the persistent journal as shown at arc 618. In response to receiving a journal entry at arc 620, the firmware health monitor 601 may trigger a rebuild of the stripe 301 at arc 622 if the received journal entry indicates that the first lock has been broken due to a timeout. That is, the health firmware health monitor may trigger redundancy controller 110B to initiate a rebuild of the stripe 301.

As a result, redundancy controller 110B may request a second lock from media controller 120B to perform a rebuild sequence as shown at arc 624 and may receive a grant for the second lock from the media controller 120B as shown at arc 626. After receiving the grant for the second lock, redundancy controller 110A may rebuild the stripe 301 by reading data A from data memory module 303 (and receiving data A from the media controller 120A) as shown at arcs 628 and 634, and reading data C from data memory module 307 (and receiving data B from the media controller 120C) as shown at arcs 630 and 632. The redundancy controller 110B may then calculate a parity by performing an exclusive-or function on data A and data B, write the parity to the parity cacheline in parity memory module 305, and release the second lock as shown at arc 636. As a result, the stripe 301 is fully rebuilt at arc 636. The media controller 120B may then transmit a completion message to the redundancy controller 110B as shown at arc 638.

Accordingly, by documenting that the first lock has been broken due to a timeout, the method 600, for example, allows a firmware health monitor to discover that a that the first lock has been broken from redundancy controller 110A and to trigger a rebuild of the stripe 301 in an attempt to mitigate risk of (non-silent) data loss.

Figure 7:
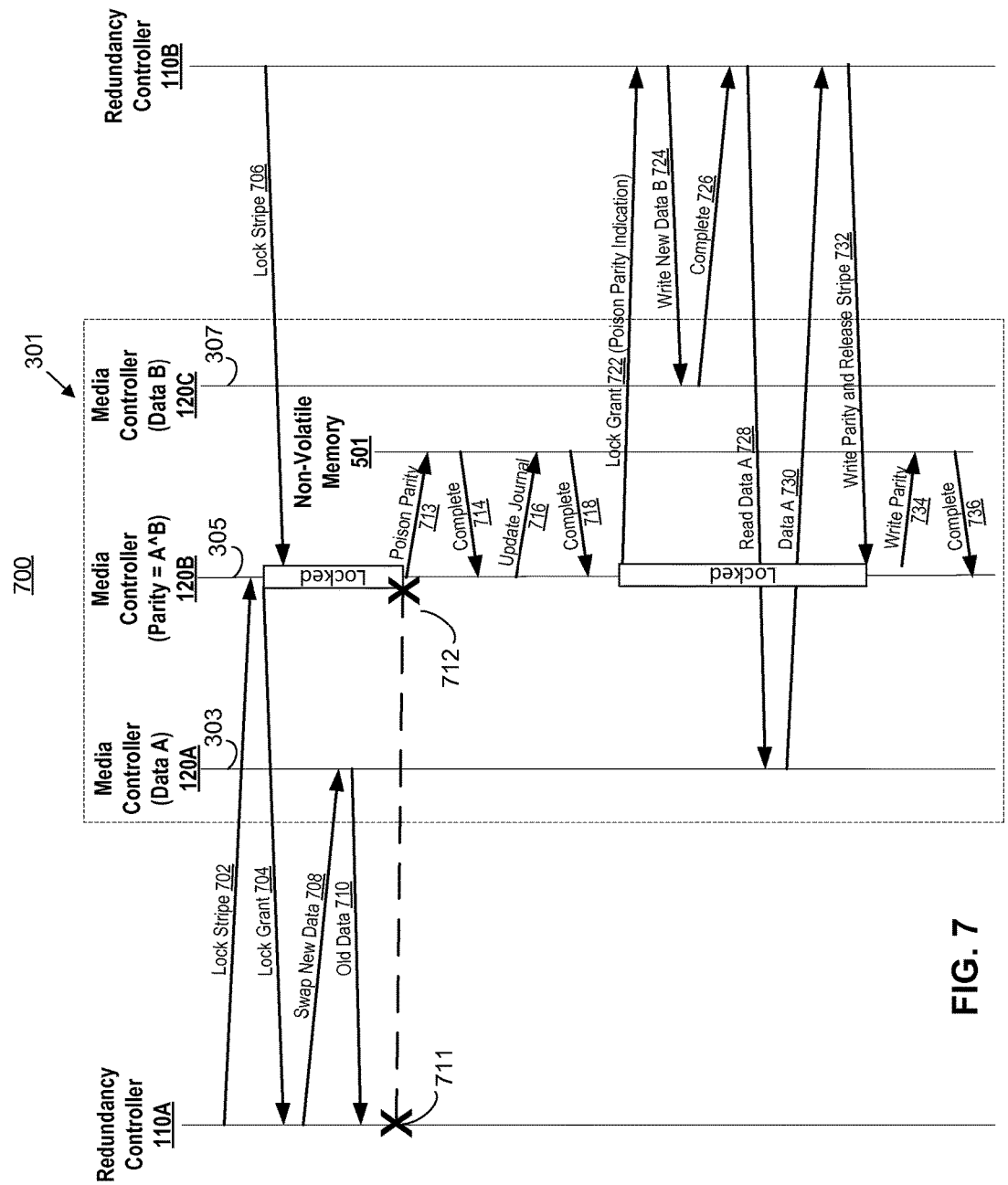
FIG. 7 shows a bounce diagram of a method to notify a redundancy controller of a poisoned parity, according to an example of the present disclosure.

FIG. 7 shows a bounce diagram of a method 700 to notify a redundancy controller of a poisoned parity, according to an example of the present disclosure. Thus, when a redundancy controller is notified of the poisoned parity, the redundancy may trigger a synchronous rebuild of the stripe 301 to prevent single point failure and mitigate risk of data loss.

Referring to FIG. 7, redundancy controller 110A may request a first lock from media controller 120B at arc 702. At arc 704, media controller 120B may grant the first lock to redundancy controller 110A. As a result, a subsequent lock request from redundancy controller 110B to media controller 120B at arc 706 is in conflict with the first lock and is therefore added to the conflict queue until the first lock is released. Redundancy controller 110A may issue a swap primitive to media controller 120A of the first data memory module 303 at arc 708 and may receive a response packet with the old data from the media controller 120A as shown at arc 710. Redundancy controller 110A, however, may experience a failure at point 711 prior to completing the sequence to modify the stripe 301, which includes updating the parity memory module 305 and releasing the lock.

In this scenario, after determining that a duration of the first lock has exceeded a predetermined time threshold, media controller 120B may break the first lock at arc 712 and poison a parity cacheline in non-volatile memory 501 of parity memory module 305 as shown at arc 713. As a result, the non-volatile memory 501 may respond with a completion message at arc 714. According to an example, the media controller 120B may document that the first lock has been broken in a persistent journal in the non-volatile memory 501 of the parity memory module 305 as shown at arc 716 and receive a completion message from the non-volatile memory 501 at arc 718.

After breaking the first lock, the media controller 120B may grant a second lock for the stripe 301 in response to the queued lock request from redundancy controller 110B as shown at arc 722. According to an example, the grant of the second lock may include an indication that the parity cacheline is poisoned. In response to receiving the notification that the parity cacheline is poisoned, redundancy controller 110B may rebuild the stripe during a sequence of the second lock. For example, redundancy controller 110B may complete a primitive to write new data B to data memory module 307 at arc 724 (and receive a completion message from media controller 120C) at arc 726. Redundancy controller 110B may then read data A from data memory module 303 at arc 728 and receive a completion message from media controller 120A at arc 730.

The redundancy controller 110B may then calculate a parity by performing an exclusive-or function on data A and data B, write the parity to the parity memory module 305, and release the second lock as shown at arc 732. Accordingly, the media controller 120B may write the parity to the parity cacheline in the non-volatile memory 501 of the parity memory module 305 at arc 734 and receive a completion message from the non-volatile memory 501 at arc 736. As a result, the stripe 301 is fully rebuilt synchronous with the sequence of the second lock. Thus, when a redundancy controller is notified of the poisoned parity, the method 700 may trigger a synchronous rebuild of the stripe 301 during a sequence of the subsequent lock to prevent single point failure and eliminate the risk of data loss in this instance.

Figure 8:
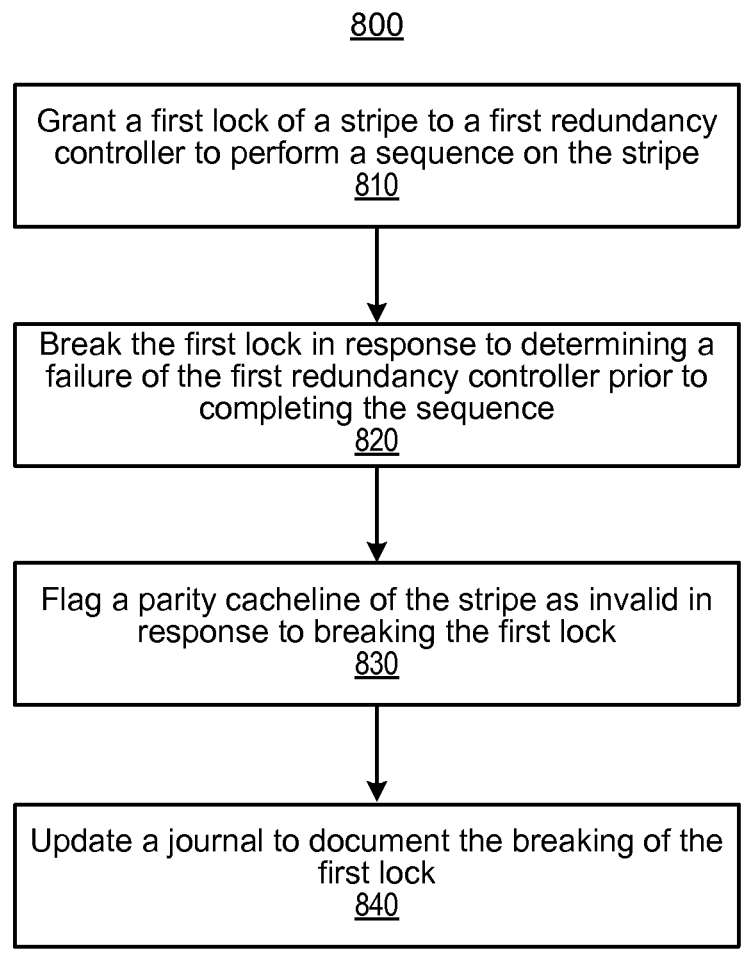
FIG. 8 shows a flow diagram of a method to prevent data corruption and a single point of failure in a fault-tolerant memory fabric, according to an example of the present disclosure.

With reference to FIG. 8, there is shown a flow diagram of a method 800 to prevent data corruption and single point of failure in a fault-tolerant memory fabric, according to an example of the present disclosure.

In block 810, a media controller, may grant a first lock of a stripe to a first redundancy controller to perform a sequence on the stripe. The media controller, for example, may be the media controller for a memory module that stores a parity cacheline. In block 820, the media controller may break the first lock in response to determining a failure of the first redundancy controller prior to completing the sequence. According to an example, the failure of the first redundancy controller may be determined if a duration of the first lock has exceeded a predetermined time threshold.

In block 830, the media controller may flag a parity cacheline of the stripe as invalid in response to breaking the first lock. In this scenario, the media controller may, for instance, grant a second lock for the stripe to a second redundancy controller. According to an example, the media controller may transmit an indication that the parity cacheline of the stripe has been flagged as invalid with the grant of the second lock. As a result, this indication may trigger the second redundancy controller to initiate a rebuild sequence of the stripe.

In block 840, the media controller may update a journal to document the breaking of the first lock. According to an example, the media controller may transmit the entry of the journal to a firmware health monitor. As a result of receiving the journal entry that documents the breaking of the first lock, the firmware health monitory may trigger the second redundancy controller to initiate a rebuild sequence of the stripe.

Some or all of the operations set forth in the methods 400-800 may be contained as utilities, programs, or subprograms, in any desired computer accessible medium. In addition, the methods 400-800 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 9:
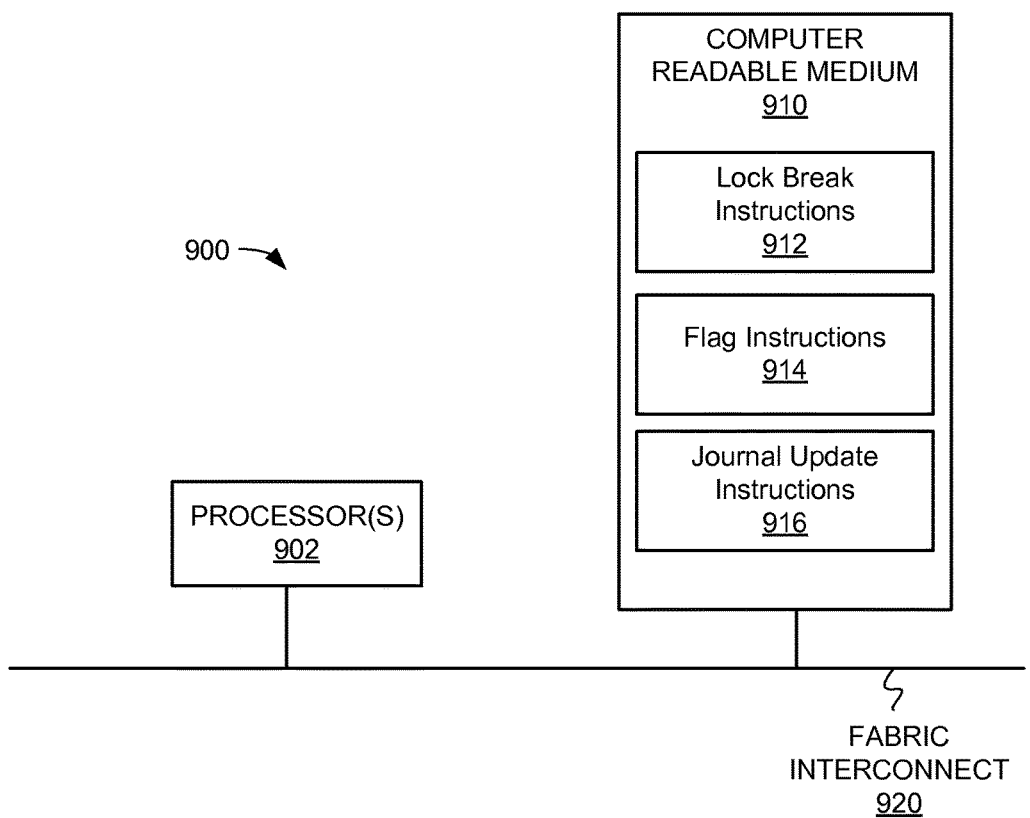
FIG. 9 shows a schematic representation of a computing device, which may be employed to perform various functions of a media controller, according to an example of the present disclosure.

Turning now to FIG. 9, a schematic representation of a computing device 900, which may be employed to perform various functions of the media controller 120 as depicted in FIG. 2B, is shown according to an example implementation. The device 900 may include a processor 902 coupled to a computer-readable medium 910 by a fabric interconnect 920. The computer readable medium 910 may be any suitable medium that participates in providing instructions to the processor 902 for execution. For example, the computer readable medium 910 may be non-volatile media, such as an optical or a magnetic disk; volatile media, such as memory.

The computer-readable medium 910 may store instructions to perform methods 400-800. For example, the computer-readable medium 910 may include machine readable instructions such as lock break instructions 912 to break a lock of a stripe in response to determining that a duration of the lock has exceeded a predetermined time threshold, flag instructions 914 to flag a parity cacheline of the stripe as invalid, and journal update 916 instructions to update a journal to document the breaking of the lock. In this regard, the computer-readable medium 910 may include machine readable instructions to perform methods 400-800 when executed by the processor 902.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for preventing data corruption and single point of failure in a fault-tolerant memory fabric with multiple redundancy controllers, the method comprising:
   granting, by a media controller, a first lock of a stripe to a first redundancy controller to perform a sequence on the stripe;
   breaking the first lock in response to determining a failure of the first redundancy controller prior to completing the sequence;
   flagging a parity cacheline of the stripe as invalid in response to breaking the first lock; and
   updating a journal to document the breaking of the first lock.

2. The method of claim 1, wherein determining the failure of the first redundancy controller comprises determining that a duration of the first lock has exceeded a predetermined time threshold.

3. The method of claim 1, wherein flagging the parity cacheline of the stripe further comprises granting a second lock for the stripe to a second redundancy controller.

4. The method of claim 3, wherein granting the second lock for the stripe to the second redundancy controller comprises transmitting an indication that the parity cacheline of the stripe has been flagged as invalid with the grant of the second lock.

5. The method of claim 4, wherein transmitting the indication further comprises triggering the second redundancy controller to initiate a rebuild sequence of the stripe.

6. The method of claim 1, wherein updating the journal to document the breaking of the first lock further comprises:
   transmitting an entry of the journal to a firmware health monitor, wherein the transmitted entry triggers a rebuild sequence of the stripe by a second redundancy controller.

7. A media controller to prevent data corruption and single point of failure in a fault-tolerant memory fabric with multiple redundancy controllers, the media controller comprising:
   a lock grant module to grant a first lock for a stripe to a first redundancy controller;
   a duration determination module to determine that a duration of the first lock has exceeded a predetermined time threshold,
   a lock break module to break the first lock of the stripe;
   a flag module to flag a parity cacheline of the stripe as invalid; and
   a journal update module to update a journal to document the breaking of the first lock.

8. The media controller of claim 7, wherein to flag the parity cacheline of the stripe, the flag module is to grant a second lock for the stripe to a second redundancy controller.

9. The media controller of claim 8, wherein to grant the second lock for the stripe to the second redundancy controller, the lock grant module is to transmit an indication that the parity cacheline of the stripe has been flagged as invalid with the grant of the second lock.

10. The media controller of claim 9, wherein to transmit the indication, the lock grant module is to initiate a rebuild sequence of the stripe.

11. The media controller of claim 7, wherein to update the journal to document the breaking of the first lock, the journal update module is to:
    transmit an entry of the journal to a firmware health monitor, wherein the transmitted entry triggers a rebuild sequence of the stripe by a second redundancy controller.

12. A non-transitory computer readable medium to prevent data corruption and single point of failure in a fault-tolerant memory, including machine readable instructions executable by a processor to:
    break a first lock of a stripe in response to determining that a duration of the first lock has exceeded a predetermined time threshold;
    flag a parity cacheline of the stripe as invalid; and
    update a journal to document the breaking of the first lock.

13. The non-transitory computer readable medium of claim 12, wherein to flag the parity cacheline of the stripe, the machine readable instructions are executable by the processor to:
    grant a second lock for the stripe to an operating redundancy controller; and
    transmit an indication that the parity cacheline of the stripe has been flagged as invalid with the grant of the second lock.

14. The non-transitory computer readable medium of claim 13, wherein to transmit the indication, the machine readable instructions are executable by the processor to trigger the operating redundancy controller to initiate a rebuild sequence of the stripe.

15. The non-transitory computer readable medium of claim 12, wherein to update the journal to document the breaking of the first lock, the machine readable instructions are executable by the processor to:
    update an entry of the journal to a firmware health monitor, wherein the entry triggers a rebuild sequence of the stripe by a second redundancy controller.

* * * * *